(12) United States Patent
O'Connell et al.

(10) Patent No.: US 6,223,843 B1
(45) Date of Patent: May 1, 2001

(54) ELECTROCHEMICAL PROPULSION SYSTEM

(75) Inventors: Daniel B. O'Connell, Rochester; Barbara S. Moore, Victor; Michael A. Stratton, Rochester; James V.. McManis, Batavia, all of NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/212,668

(22) Filed: Dec. 16, 1998

(51) Int. Cl.⁷ .................................................. B60K 1/00
(52) U.S. Cl. ............................................... 180/65.3
(58) Field of Search .................... 180/65.1, 65.3, 180/65.4, 303, 65.2; 429/17, 19, 20

(56) References Cited

U.S. PATENT DOCUMENTS

| | | | |
|---|---|---|---|
| 3,911,284 | * 10/1975 | Skala ....................................... | 290/16 |
| 5,193,635 | 3/1993 | Mizuno et al. ...................... | 180/65.3 |
| 5,248,566 | 9/1993 | Kumar et al. ........................... | 429/19 |
| 5,641,031 | 6/1997 | Riemer et al. ..................... | 180/65.3 |
| 5,662,184 | 9/1997 | Riemer et al. ....................... | 180/65.1 |
| 5,678,647 | * 10/1997 | Wolfe et al. ........................ | 180/65.3 |
| 5,858,568 | * 1/1999 | Hsu et al. ............................... | 429/13 |

FOREIGN PATENT DOCUMENTS

109127 * 9/1989 (JP) ..................................... 180/65.1

* cited by examiner

Primary Examiner—Brian L. Johnson
Assistant Examiner—M B Klebe
(74) Attorney, Agent, or Firm—Laura C. Hargitt

(57) ABSTRACT

An electrochemical propulsion system in a vehicle comprises a hydrogen generator for converting fuel into hydrogen-containing gas and a fuel cell stack using the hydrogen-containing gas to produce electricity to power a drive motor for the vehicle. The fuel cell stack is oriented parallel to the vehicle longitudinal direction. The hydrogen generator is arranged longitudinally forward of the fuel cell stack and to the lateral side of the fuel cell stack. The fuel cell stack and the hydrogen generator are located within a front vehicle compartment of the vehicle in a closely adjacent manner. The hydrogen generator comprises a combustor for producing heat, a reformer closely adjacent to the combustor for converting fuel into hydrogen-containing gas using heat from the combustor, and a reactor to reduce carbon monoxide content from the hydrogen-containing gas wherein the reactor is adjacent to and downstream of the reformer. The drive motor is operatively connected to a wheel axle for driving vehicle wheels.

4 Claims, 3 Drawing Sheets

ELECTROCHEMICAL PROPULSION SYSTEM

TECHNICAL FIELD

The present invention relates to an electrochemical propulsion system in a vehicle.

BACKGROUND OF THE INVENTION

As fuel cell power plants are being designed into useable motor vehicles in place of internal combustion engines, packaging of the hardware becomes an issue. It is important not to impede on the requirements for maximized passenger compartment and storage space as these are important customer considerations. Fuel cells that are arranged at or about the vehicle center of gravity may restrict passenger compartment volume.

Another potential arrangement for packaging a fuel cell is to arrange the components below the vehicle floor. One disadvantage may be that the overall vehicle height is raised to accommodate ground clearances and maintain passenger compartment volume. In addition, hardware that is not closely coupled requires longer connections therebetween which increases the potential for system pressure drops and thermal losses.

SUMMARY OF THE INVENTION

The present invention provides an arrangement of an electrochemical propulsion system, which supplants a known internal combustion engine and transmission in a motor vehicle. The electrochemical engine is packaged in the space conventionally occupied by an internal combustion engine. The arrangement accommodates fuel cell system hardware within the front vehicle compartment to retain full function of the vehicle by not infringing upon the passenger compartment nor upon storage volume.

The components may be arranged in the order of gas flow to provide further system efficiencies including thermal, packaging, and pumping. By arranging the hardware in close proximity, shorter interconnect lengths are required which minimizes system pressure drop. Further, shorter interconnect lengths limit the amount of hydrogen carried on-board.

DESCRIPTION OF THE PREFERRED EMBODIMENT

Figure 1:
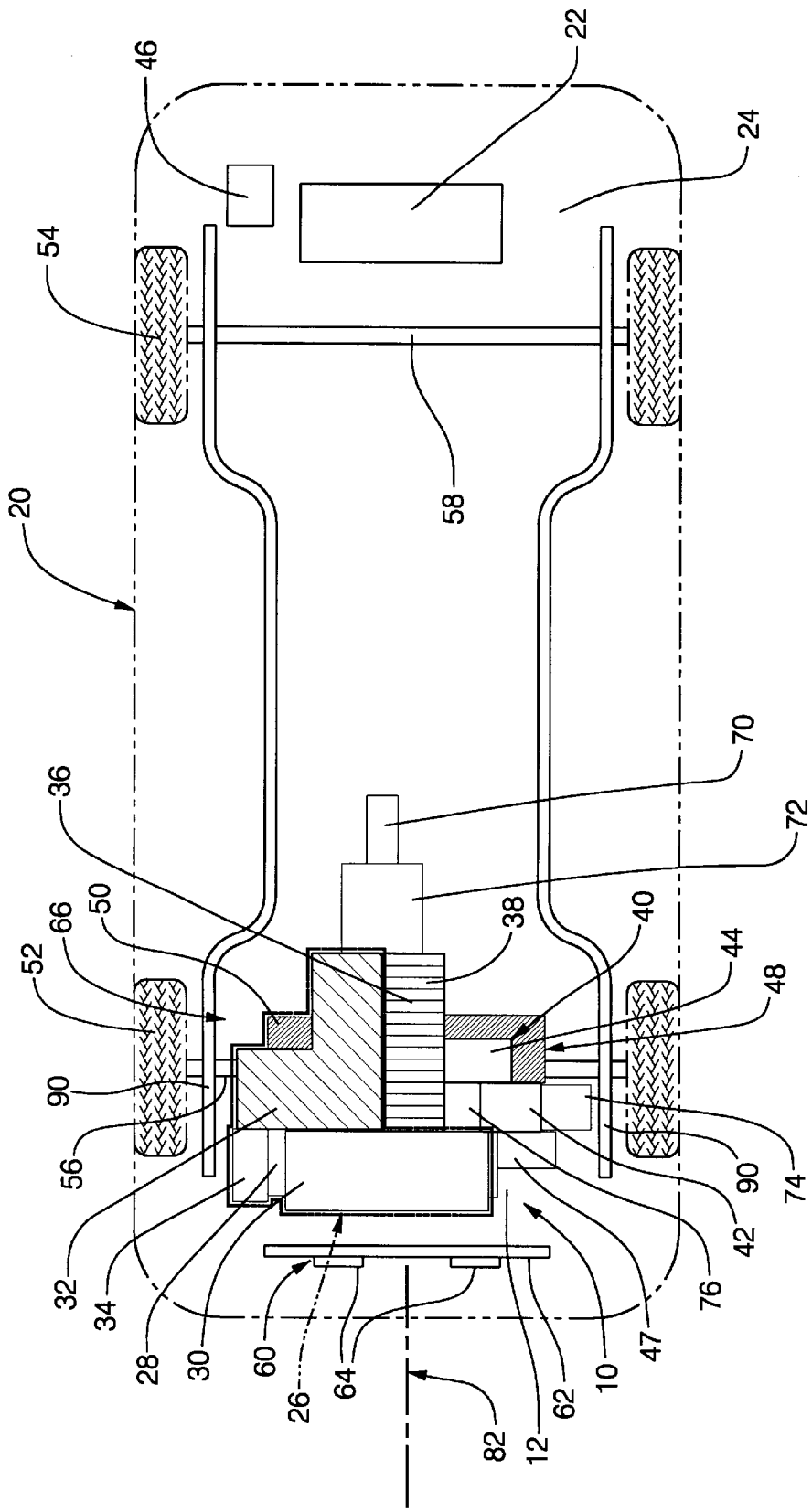
FIG. 1 is a schematic plan view of a vehicle embodying the present invention.
Figure 2:
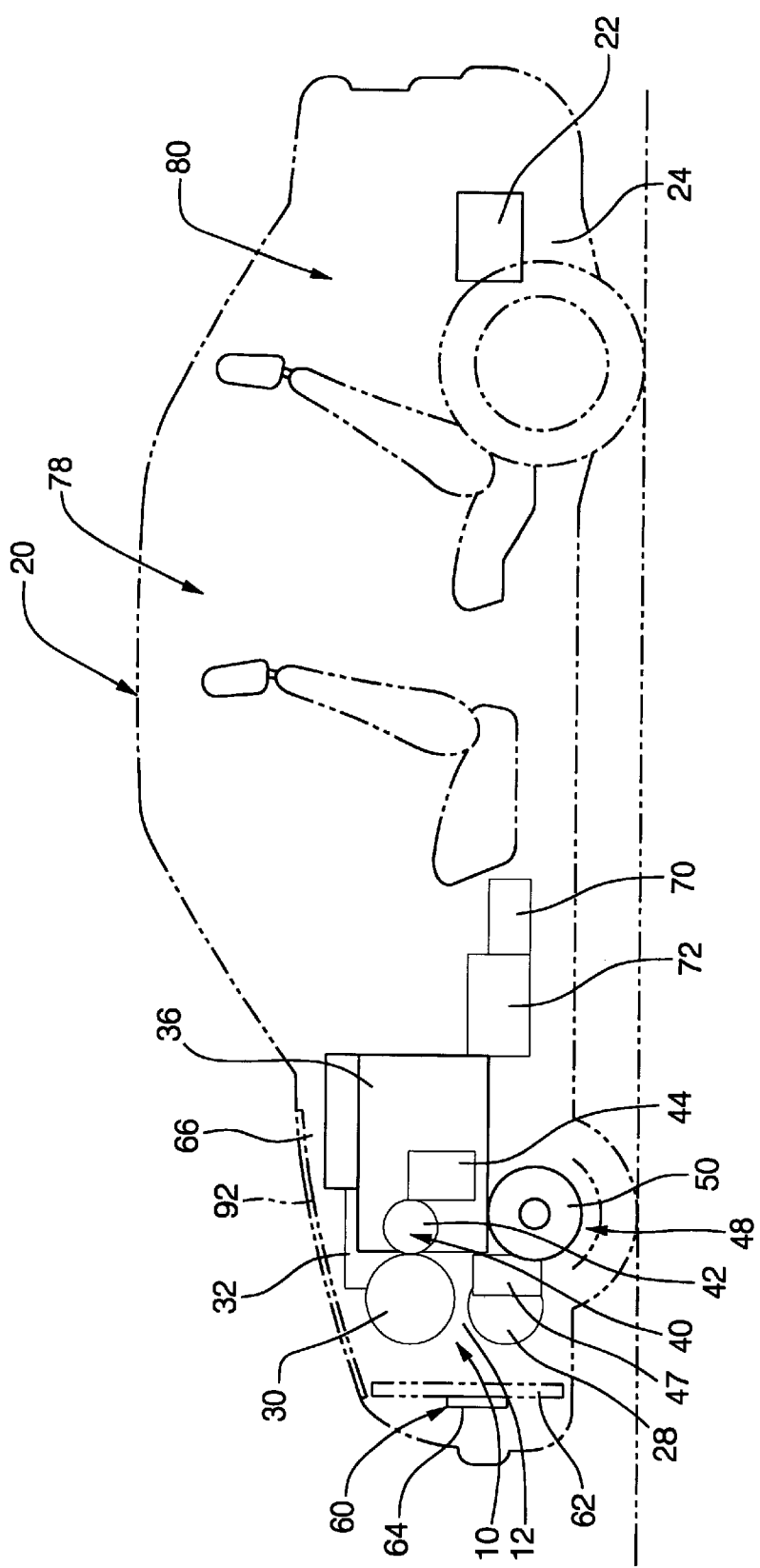
FIG. 2 is a schematic side view of FIG. 1.

An electrochemical propulsion system uses an electrochemical engine to generate electricity to power a drive system for propelling a vehicle. The electrochemical engine of the present invention is applicable in vehicles of any configuration such as a passenger car, truck, or van. FIGS. 1 and 2 illustrate an arrangement of an electrochemical propulsion system 10 in a vehicle 20 comprising an electrochemical engine 12 and a drive system 48.

First, the operation of an electrochemical propulsion system 10, defining the fuel and gas flow paths, is described briefly with reference to FIGS. 1 and 2. Fuel that can be reformed to hydrogen on board a vehicle 20 such as gasoline, methanol, diesel, etc. is stored in a fuel tank 22 in the rear underbody compartment 24 of the vehicle in a manner known in the art. Fuel is supplied to a hydrogen generator, shown generally as 26 in FIG. 1, which includes a combustor 28 and a reformer 30 which may include a partial oxidation reactor. The combustor 28 generates and supplies heat to the reformer 30, wherein the reformer partially oxidizes and reforms the fuel to produce a hydrogen-containing gas; this process is referred to as 'cracking' the fuel to produce hydrogen. To reduce residual carbon monoxide in the reformed product, the hydrogen generator 26 may further include one or more carbon monoxide reduction reactors 32 where one may be a preferential oxidation reactor through which the hydrogen-containing gas is passed. If cooling is necessary for preparing the final product gas, then a hydrogen gas cooler 34 may be included as part of the hydrogen generator 26.

The final hydrogen-containing gas is delivered under pressure to a fuel cell stack 36. The fuel cell stack 36 carries a series of individual bipolar fuel cell plates 38, as is known in the art. The hydrogen-containing gas is fed through an anode, not shown, to create positively charged hydrogen ions.

An air generator 40 is comprised of a closely coupled air compressor 42 and may include an optional cathode humidifier 44 to provide a humidified oxidant supply to a cathode, not shown, of the fuel cell plates 38. The cathode is separated from the anode by an electrolyte. If a humidifier 44 is used, it may receive deionized water from a water reservoir 46. If cooling is necessary, then an air cooler 47 may be included as part of the air generator 40.

Electricity is generated in the fuel cell stack 36 by processing the hydrogen and oxygen in a manner known in the art. The generated electricity powers the drive system 48 which includes at least one electric drive motor 50 and incorporated controller, operatively connected to a pair of front vehicle wheels 52 such as by a front axle 56. Alternatively, although not illustrated, the drive motor may be operatively connected to a pair of rear vehicle wheels 54 such as by a rear axle 58. A further configuration not shown provides a drive motor at each of the front wheels and/or rear wheels such that the drive system may be used to power a front-wheel drive, rear-wheel drive, or an all-wheel drive vehicle.

A thermal management system 60 comprising a heat exchanger 62 and adjacent cooling fan 64 is located at the forward end of the front vehicle compartment 66, longitudinally forward of the electrochemical engine 12, in a position providing maximum exposure to cooling air flow.

Further auxiliary components may be used in conjunction with the electrochemical propulsion system 10. For example an engine controller 70 may be used to monitor and schedule fuel delivery to control the electrochemical process. A voltage converter 72 may operate between the fuel cell stack 36 and the drive system 48 to adjust the voltage of the generated electricity. Such auxiliary components may be packaged in the floor pan chassis tunnel or within the front vehicle compartment.

Clean inlet air may be provided through an air cleaner and filter 74 mounted directly to the air compressor 42 inlet. Outlet gases from the fuel cell stack 36 may be delivered back to the combustor 28 to be consumed for further heat generation, whereas final exhaust may be delivered to an integral expander 76, which generates power for the air compressor 42.

Next, with reference to FIGS. 1 and 2, the arrangement for packaging the electrochemical propulsion system 10 will be discussed. The arrangement allows for the electrochemical engine hardware to be packaged in the space traditionally occupied by an internal combustion engine and transmission and parallels a conventional layout for such an internal combustion engine powertrain. The space traditionally occupied by a conventional internal combustion engine, herein referred to as the front vehicle compartment 66, is the space bounded between the front frame rails 90, below the hood line 92, and forward of the passenger compartment 78. The electrochemical engine 12, comprising at least the hydrogen generator 26, air generator 40, and fuel cell stack 36, is centrally located in the front vehicle compartment 66. The electrochemical engine 12 is mounted to the vehicle structure in a manner known in the art such as through damped engine mounts. The drive system 48 is attached to either a front or rear axle 56 or 58 as determined by the drive configuration desired similar to a differential in a drive system for an internal combustion engine. The drive motor 50 replaces the internal combustion engine differential which converts engine rotation into wheel rotation. The thermal management system 60 comprising the heat exchanger 62 and cooling fan 64 is located longitudinally forward of the electrochemical engine 12 to provide adequate cooling to the engine as is typical of a vehicle radiator. The fuel tank 22 is located in the rear underbody compartment 24 as in a conventional vehicle such that it does not impede on passenger compartment 78 or vehicle storage space 80. Since the general arrangement corresponds to a conventional layout, neither the passenger compartment 78 nor the storage space 80 is compromised.

The electrochemical engine 12 components are arranged in series—an efficient manner where each component is closely adjacent to the component it receives input from (i.e. heat, hydrogen, electricity), and adjacent to the component it delivers output to. Within the hydrogen generator 26, the combustor 28 which provides heat to the reformer 30 is arranged closely adjacent to the reformer to minimize heat loss and to avoid thermal mass from being introduced to the system. The carbon monoxide reduction reactor 32, which removes carbon monoxide from the hydrogen-containing gas product of the reformer 30, is arranged closely adjacent to and downstream of the reformer. The hydrogen-containing gas product of the reactor 32 may be delivered to a cooler 34, which is arranged adjacent and downstream of the reactor. The fuel cell stack 36 which accepts the cooled gas is arranged adjacent and downstream of the cooler 34. Alternatively, if a cooler 34 is not necessary for the process, then the fuel cell stack 36 is arranged adjacent and downstream of the reactor 32.

The fuel cell stack 36 may be positioned so its long dimension is parallel to the vehicle longitudinal axis 82 as shown in FIG. 1. With this configuration, the hydrogen generator 26 is arranged such that it is directly longitudinally forward of the fuel cell stack 36, such that the hydrogen generator is adjacent to a forward end of the fuel cell stack, and to the lateral side of the stack, while maintaining close component adjacency as described above.

Figure 3:
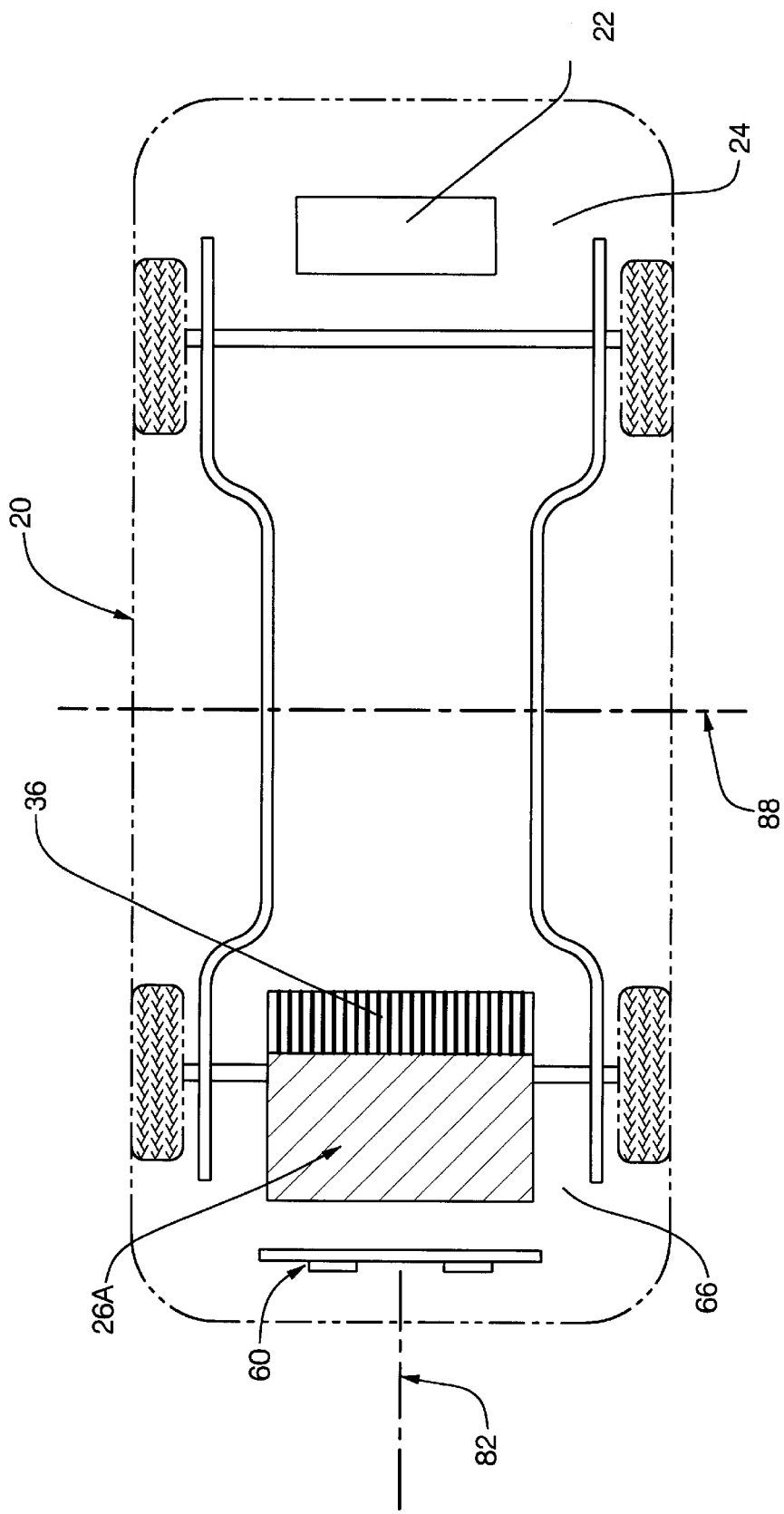
FIG. 3 is a schematic plan view of a vehicle embodying a second embodiment of the present invention.

In a second embodiment shown in FIG. 3, the fuel cell stack 36 may be positioned so its long dimension is parallel to the vehicle lateral axis 88 (i.e. it is positioned transversely to the vehicle longitudinal axis). In this configuration, the hydrogen generator, designated generally as 26A, is arranged longitudinally forward of the fuel cell stack 36 and closely adjacent to it.

The close proximity of adjacent components in the arrangements illustrated improve overall efficiencies by minimizing the length of connections between components, which minimizes system pressure drops and thermal losses. The arrangements also retain approximately the same weight distribution as a current motor vehicle thereby not substantially affecting vehicle dynamics.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. An electrochemical propulsion system in a vehicle, comprising:

a combustor for producing heat, a reformer for converting fuel into hydrogen-containing gas using heat from said combustor, a fuel cell stack using the hydrogen-containing gas to produce electricity, an air generator comprising an air compressor and a humidifier to provide a humidified oxidant supply to said fuel cell stack, and a drive motor coupled to said fuel cell stack to receive electricity generated by said fuel cell stack to propel the vehicle, wherein said combustor, said reformer, said fuel cell stack, and said air generator are located in series within a front vehicle compartment of the vehicle and wherein said air compressor and said humidifier are located upstream of said fuel cell stack.

2. An arrangement of an electrochemical propulsion system in a vehicle comprising an electrochemical engine centrally located with a front vehicle compartment of the vehicle, a drive system powered by electricity generated from said electrochemical engine comprising a drive motor operatively connected to a wheel axle for driving a wheel, a thermal management system comprising a heat exchanger and cooling fan to cool said electrochemical engine located longitudinally forward of said centrally located electrochemical engine, and a fuel tank to supply fuel to said electrochemical engine located in a rear underbody compartment of the vehicle.

3. An arrangement of an electrochemical propulsion system in a front vehicle compartment of a vehicle comprising a hydrogen generator for converting fuel into hydrogen-containing gas and a fuel cell stack using the hydrogen-containing gas to produce electricity to power a drive motor for the vehicle wherein said fuel cell stack is oriented transversely to the vehicle longitudinal direction and said hydrogen generator is arranged longitudinally forward of and closely adjacent to said fuel cell stack.

4. An arrangement of an electrochemical propulsion system in a vehicle comprising a hydrogen generator for converting fuel into hydrogen-containing gas and a fuel cell stack using the hydrogen-containing gas to produce electricity to power a drive motor for the vehicle wherein said fuel cell stack is oriented parallel to the vehicle longitudinal direction and said hydrogen generator is arranged directly longitudinally forward of said fuel cell stack, such that said hydrogen generator is adjacent to a forward end of said fuel cell stack and to a lateral side of said fuel cell stack, and further wherein said fuel cell stack and said hydrogen generator are located within a front vehicle compartment of the vehicle maintaining close component adjacency.

* * * * *